March 24, 1959     E. GAGNAN     2,878,807
OPEN CIRCUIT BREATHING APPARATUS
Filed Feb. 7, 1955     2 Sheets-Sheet 1

Inventor
EMILE GAGNAN
By Alan Swabey
Attorney

March 24, 1959   E. GAGNAN   2,878,807
OPEN CIRCUIT BREATHING APPARATUS
Filed Feb. 7, 1955   2 Sheets-Sheet 2

Inventor
EMILE GAGNAN
By Alan Swabey
Attorney

2,878,807

OPEN CIRCUIT BREATHING APPARATUS

Emile Gagnan, Montreal, Quebec, Canada, assignor to La Spirotechnique Societe Anonyme, Paris, France Application February 7, 1955, Serial No. 486,539

9 Claims. (Cl. 128—142)

The present invention relates to improvements in the open circuit type of respiratory apparatus in which a breathable gas, for example, air compressed under a very high pressure in a cylinder, is expanded in a pressure regulator to a pressure substantially equal to that of the unbreathable medium wherein the apparatus is being used, and fed under this balanced pressure to the user who expels the breathed gas directly into the medium.

The usual pressure regulator in an apparatus of this type includes a chamber provided with a diaphragm, the outer face of which is subjected to the pressure of the ambient medium. The consequent deformation of the diaphragm controls a valve which feeds the gas under pressure into the regulator chamber. This valve is constructed and regulated so as to open as soon as the pressure inside the chamber falls to a certain value below the pressure of the outside medium and it closes as soon as the pressure within the chamber is at least equal to the outside pressure. The user can only breathe in the air previously fed to this chamber which is conducted to his mouth by a single air conduit which necessarily is of large diameter so as to give an adequate supply, and of sufficient length to extend from the regulator to adjacent the mouth of the user.

These conditions give rise to the following effects:

Due to the section of the air conduit, a pressure drop occurs between the regulator chamber and the mouth of the user creating for him an additional effort in breathing. In addition to that effort, when the apparatus is used in diving, the diver must also usually contend with the difference in pressure between that acting on the regulator and the center of his lungs, as long as the regulator, located on the diver's back, is normally located above his body in the water. Accordingly, the breathing of the diver is facilitated if a raise of pressure is provided in the air conduit to counteract these pressure differences.

The present invention aims to accomplish this by providing a means for injecting at least a part of the air under pressure delivered to the valve directly into the air conducting conduit so that the pressure is increased.

This application is a continuation-in-part of United States application No. 434,859, filed June 7, 1954.

Having thus generally described the nature of the invention, particular reference will be made to the accompanying drawings, wherein there is shown by way of illustration, several preferred embodiments thereof and in which.

Figure 1:
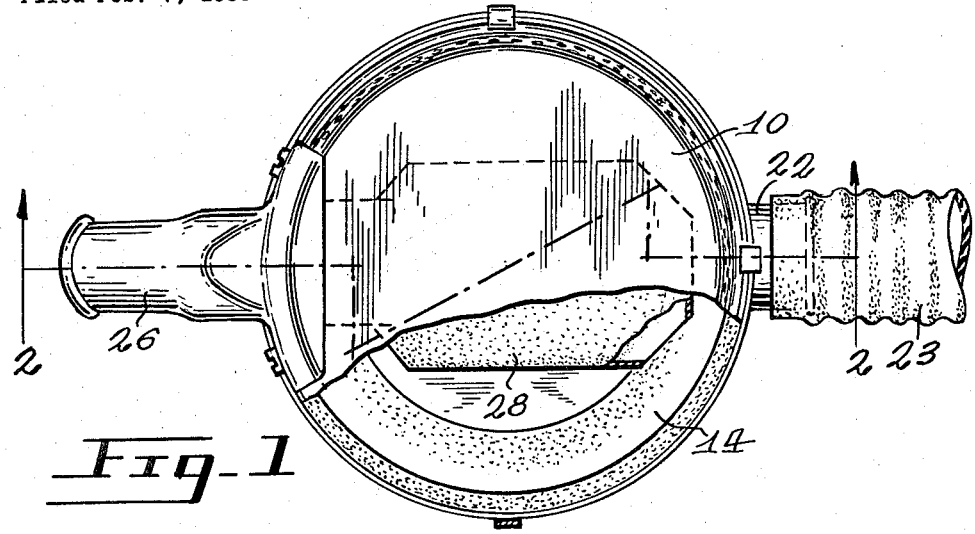
Figure 1 is a view in plan of a pressure regulator embodying an air jetting means according to the invention.
Figure 2:
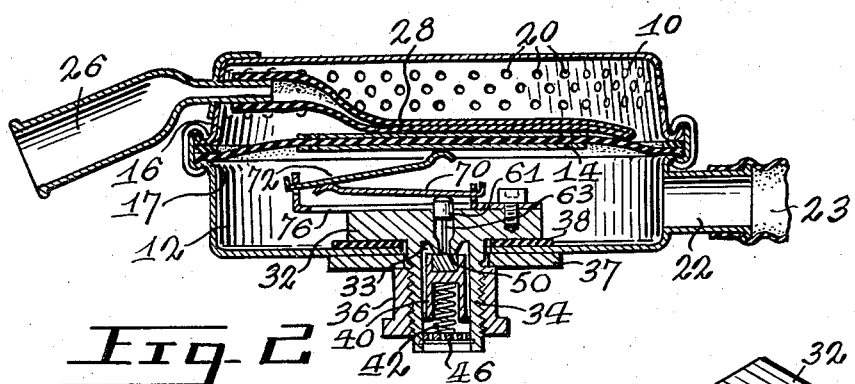
Figure 2 is a cross sectional view along the line 2—2 of Figure 1.

With particular reference to Figures 1 and 2, a regulator is shown as comprising a two-piece casing 10 inside of which a pressure chamber 12 is provided, the upper deformable wall of which is constituted by a flexible diaphragm 14. The diaphragm 14, as shown, is clamped along its periphery between a flange 16 of the top casing portion and a corresponding flange 17 of the bottom casing portion. The top casing portion includes numerous openings indicated at 20 for allowing the pressure of the surrounding medium, the unbreathable atmosphere or water in the case of a respiratory apparatus for diving, to react on the outer face of the diaphragm.

The lower portion of the casing 10 includes an outlet nipple 22 to which the air conduit 23 of the breathing apparatus is attached. The air intake conduit 23 extends from this position to the face mask or mouthpiece of the breathing apparatus. A similar conduit (not shown) extends from the exhaust side of the mask or mouthpiece and is connected to an exhaust nozzle 26 which is secured to and extends within the upper portion of the casing 10, as shown in Figure 2. A flapper type exhaust valve 28 is secured to this portion of the exhaust nozzle.

Figure 7:
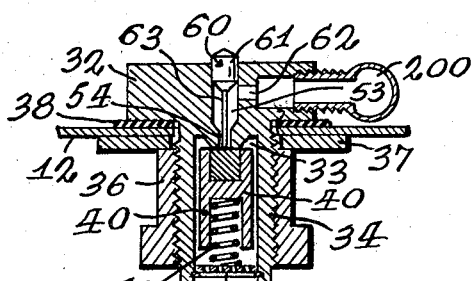
Figure 7 is a sectional view along the line 6—6 of Figure 5 to illustrate the construction of the air inlet valve relative to the gas delivery member with the valve shown in closed position.
Figure 8:
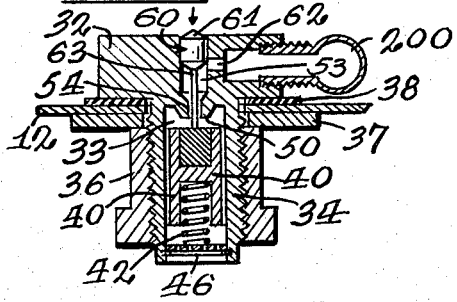
Figure 8 is a sectional view corresponding in location to Figure 7 with the valve shown in open position.

In the embodiments shown and with particular reference to Figures 2, 7 and 8, the air inlet valve is arranged inside a valve box 32 secured on the bottom of the lower portion of the casing 10. The box 32 is provided with a threaded tail piece 34 which passes through a central opening provided in the bottom of the casing 10 and is retained in position by a threaded flanged sleeve 36. A sealing ring 37 and a gasket 38 are placed between the bottom of this casing and the sleeve 36 and between the bottom of the container 10 and the valve box 32 respectively to complete the seal.

The valve box 32 shown includes a lower recess 33 extending through the tail piece 34 and a valve block 40 is slidably mounted in this recess. A coil spring 42 is provided in the cavity 33 between a perforated plate 46 and the valve block 40 so as to normally urge it upwards towards a valve seat 50. A further recess having an upper portion 53 and a lower portion 54 is provided in the valve box 32 leading to the valve seat 50 and in axial alignment with the recess 33 of the tail piece 34. A needle pusher 60 having a cylindrical top portion 61 and a stem portion 63 is slidably mounted in the recess 53 so that the lower stem portion 63 passes through the recess 54 and rests on the top of the valve block 40. A passage 62 connects the recess upper portion 53 with the member for directing the air under pressure to the air conduit.

In the construction illustrated the deflection of the diaphragm 14 is transmitted to the portion 61 of the needle 60 of the valve arrangement through a pair of cooperating lever arms 70, 72 which are pivotally supported at one end above the needle pusher 60 on a supporting bracket 76 secured to the valve box 32. A source of gas under pressure, in this case a high pressure air cylinder, is connected to the valve tail piece 34 by suitable means (not illustrated). These arrangements are generally known in apparatus of the type described.

In accordance with the present invention, the air under pressure delivered through the valve arrangement described, and under the influence of the inhalation of the user, is not discharged directly into the inner chamber 12 adjacent the diaphragm 14 as is known in prior apparatus of this nature.

In the present arrangement, means are provided for directing the air under pressure delivered through the inlet valve in a jetted stream into the regulator end of the air intake tube.

Figures 3, 4:
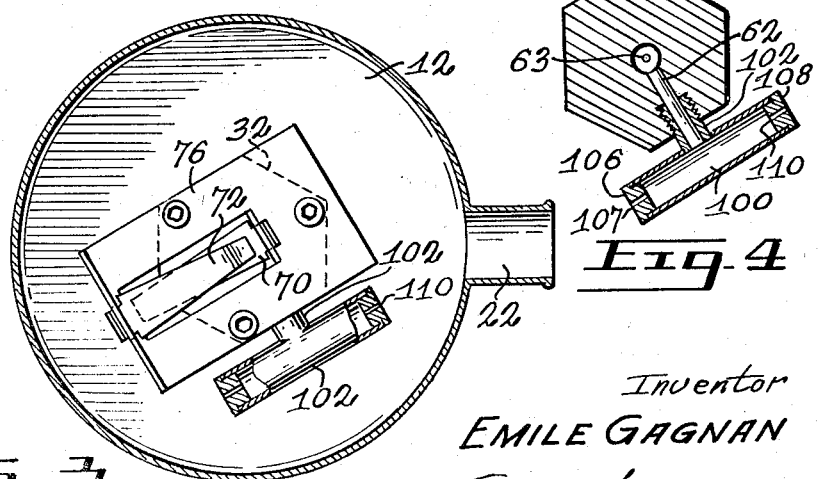
Figure 3 is a sectional view of the lower portion of the regulator in plan illustrating the relative position of a preferred form of gas delivery member in accordance with the invention.
Figure 4 is an enlarged detail view in section of the gas delivery member shown in Figure 3.

In one preferred embodiment of this air jetting means, as shown in Figures 3 and 4, a tubular cylindrical member 100 is provided having a threaded tubular side extension 102 which is engaged in the threaded end of the air outlet passage 62 of the valve. The member 100 is sealed at each end by plates 106, 108, with the forward plate 108 having a jet opening 110. The axis of the member 100 and consequently the jet opening 110 is directed diagonally towards the air outlet nipple 22 to which the air intake conduit 23 is attached.

Since it is desired to control the velocity of the jet of air emitting from the jet nozzle 110 to a degree where it is effective to give the desired increase in pressure to the air intake conduit, but yet not be of such extreme velocity so as to unduly raise the pressure, the diameter of the jet opening 110 must be accordingly controlled. As a means of reducing the pressure within the body of the member 100, a further opening 107 may be provided in the opposite end plate 106 so as to discharge directly into the interior of the chamber 12.

Figure 5:
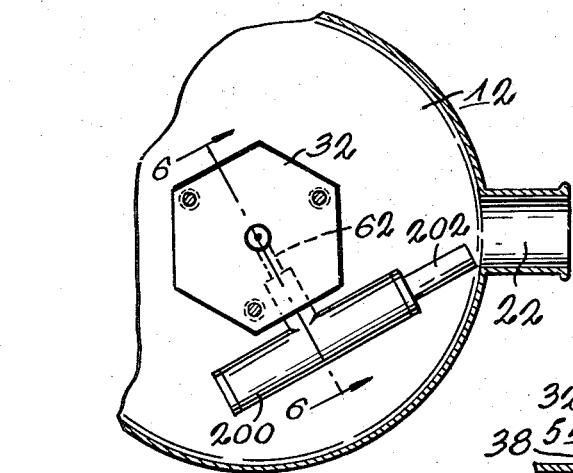
Figure 5 is a partial plan view corresponding to Figure 3 to illustrate an alternative form of gas delivery member.
Figure 6:
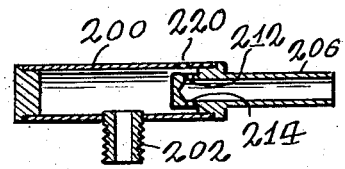
Figure 6 is an enlarged detail view in section of the gas delivery member shown in Figure 5.

In one alternative construction as shown in Figures 5 and 6, the gas delivery member is shown as comprising a main cylindrical tube 200 having a tubular extension 202 which is connected to the valve box outlet passage 62 as before. In order to control the velocity of the air stream delivered, the member 200 is provided with a further forward extension 206 also of cylindrical tubular formation which has an internal diameter considerably greater than that of jet opening 110 in the first construction described. The inner end of the forward extension 206 is sealed off and air under pressure from the valve is delivered to the interior of the member 206 by reduced diameter jet openings 212, 214. This construction provides a jet of sufficient velocity to be delivered from the extension 206 to overcome the pressure drop in the air conduit. In this form, there also may be provided, if desired, a second discharge opening 220 leading from the main body 200 which is directed into the interior of the chamber 12.

In the constructions shown, the damping effect of the internal capacity of the members 100, 200, is obtained by having sufficiently small and calibrated jet openings. This damping effect smooths out the ejection of air under pressure through the jet nozzles so as to prevent the setting up of the known pulsating or "whirring" action of the air inlet valve.

The gas delivery members 100, 200, 206 shown in Figures 3 through 6 are preferably disposed, as illustrated, relative to the valve box 32 so that the stream of air is jetted into the air intake conduit at an angle relative to the axis of the air outlet nipple 22 and the air intake conduit. This is to turbulize and break up the stream of air delivered so that it will flow more evenly through the air intake conduit.

Figure 9:
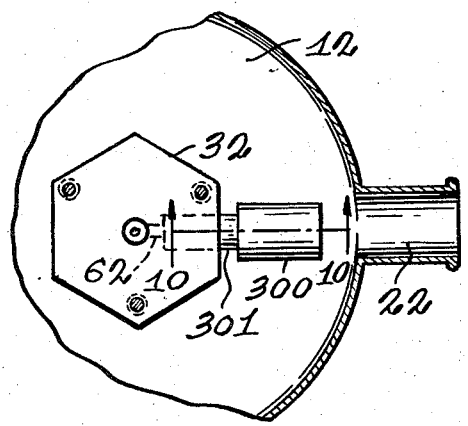
Figure 9 is a partial plan view corresponding to Figures 3 and 5 with a still further alternative form of gas delivery member illustrated.
Figure 10:
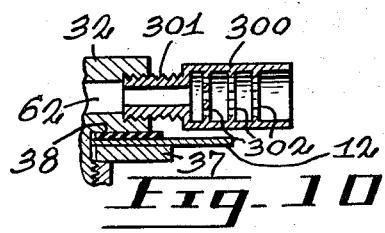
Figure 10 is a sectional view along the line 10—10 of Figure 9 to illustrate the construction of the further alternative gas delivery member in more detail.

In the further alternative construction, as shown in Figures 9 and 10, the gas delivery member 300 is again constructed as a cylindrical tubular element connected to the valve by a threaded extension 301. However, the member 300 is disposed directly in front of and in axial alignment with the air outlet conduit nipple 22 so that the stream is directed substantially along the axis of the nipple 22 and conduit. The member 300 has a main tubular portion of greater internal diameter than the jet nozzles previously described. In order to reduce the velocity of the air stream delivered, a plurality of spaced apart perforated baffle plates 302 are employed so that as the stream of air is discharged from the inlet valve into the member 300 it is broken and turbulized greatly reducing the velocity prior to its direction into the air conduit.

I claim:

1. In an open circuit breathing apparatus of the type having a pressure regulator including an inner chamber, an inlet valve in said chamber for a breathable gas fed from a pressure source, valve controlling means mounted in said regulator including a diaphragm having an outer face subjected to the pressure of the medium and an air intake conduit extending from said regulator chamber to a mouthpiece; at least one cylindrical gas delivery tube connected directly to a gas discharge outlet provided in said inlet valve with the axis of said tube disposed transversely to the axis of said air inlet valve and directed towards the axis of the regulator end of said air intake conduit, said gas delivery tube having a gas discharge jet opening at one end adapted to direct a stream of air into said air intake conduit regulator end and means whereby said stream of air emitting from said gas delivery tube jet discharge opening is at least partially deflected prior to its passage along the interior of said air intake conduit.

2. In an open circuit breathing apparatus as claimed in claim 1, wherein said means to deflect the jet air stream delivered from the jet opening comprises a cylindrical nozzle surrounding said jet discharge opening and at least one perforated baffle in said nozzle in the path of the said air stream.

3. In an open circuit breathing apparatus of the type having a pressure regulator including an inner chamber, an inlet valve in said chamber for a breathable gas fed from a pressure source, valve controlling means mounted in said regulator including a diaphragm having an outer face subjected to the pressure of the medium and an air intake conduit extending from said regulator inner chamber to a mouthpiece; at least one gas delivery member connected by an air inlet conduit to said inlet valve and having a closed end provided with a gas discharge opening directed into said intake conduit, the internal capacity of said air inlet conduit, gas delivery member and the diameter of said jet opening being such that said gas delivery member functions as a damper and means to at least partially deflect a gas stream delivered from said gas delivery jet opening prior to its passage along the interior of said air intake conduit.

4. In an open circuit breathing apparatus of the type having a pressure regulator including an inner chamber, an inlet valve in said chamber for a breathable gas fed from a pressure source to the valve controlling means mounted in said regulator including a diaphragm having an outer face subjected to the pressure of the medium and an air intake conduit extending from said inner chamber to a mouthpiece, a gas delivery member connected to said inlet valve and having a gas discharge jet opening directed into said air intake conduit, said gas delivery member being mounted within said chamber in a position relative to said air intake conduit whereby said jet opening is adapted to direct a stream of air into said conduit at an angle relative to the axis of said conduit and reduce the direct pressure action of said air stream.

5. In an open circuit breathing apparatus as claimed in claim 4, wherein said gas discharge jet is of considerably lesser diameter than the main body of said member and leads directly from said member.

6. In an open circuit breathing apparatus of the type having a pressure regulator including an inner chamber, an inlet valve in said chamber for a breathable gas from a pressure source, valve controlling means mounted in said regulator including a diaphragm having an outer face subjected to the pressure of the medium and an air intake conduit extending from said regulator inner chamber to a mouthpiece; at least one cylindrical gas delivery tube having a discharge jet opening at one end and being connected directly to a gas discharge outlet provided in said gas inlet valve with the axis of said tube disposed transversely of the axis of said air inlet valve and at an angle relative to the axis of said air intake tube whereby said jet opening is adapted to direct a jet of air into and diagonally across the axis of said conduit to reduce the direct pressure action of said jet stream.

7. In an open circuit breathing apparatus of the type having a pressure regulator including an inner chamber, an inlet valve in said chamber for a breathable gas from a pressure source, valve controlling means mounted in said regulartor including a diaphragm having an outer face subjected to the pressure of the medium, and an air intake conduit extending from said regulator inner chamber to a mouthpiece; at least one cylindrical gas delivery tube connected directly to a gas discharge outlet provided in said gas inlet valve with the axis of said tube disposed transversely of the axis of said air inlet valve and at an angle relative to the axis of said intake conduit, said cylindrical gas delivery tube having a discharge jet opening at one end adapted to direct a stream of gas under pressure into the regulator end of said air intake conduit, said gas discharge jet opening being of considerably lesser diameter than the main body of said gas delivery tube and leading directly from said main body.

8. In an open circuit breathing apparatus as claimed in claim 7 wherein said gas delivery tube is provided with a cylindrical extension of lesser diameter than the main body of said tube having an inner closed end disposed within the body of said gas delivery tube and an open outer end constituting said gas discharge jet opening, at least one gas delivery opening of reduced diameter in the inner end of said delivery tube extension.

9. In an open circuit breathing apparatus of the type having a pressure regulator including an inner chamber, an inlet valve in said chamber for a breathable gas fed from a pressure source to the valve controlling means mounted in said regulator including a diaphragm having an outer face subjected to the pressure of the medium and an air intake conduit extending from said regulator inner chamber to a mouthpiece; at least one gas delivery member connected to said inlet valve and having a gas discharge jet opening, said gas delivery member being mounted within said chamber in axial alignment with said air intake conduit and adapted to direct a stream of air along the axis of said air conduit, and at least one perforated baffle mounted in front of said jet opening in the path of said air stream adapted to reduce the direct pressure action of said jet along said conduit.

References Cited in the file of this patent

UNITED STATES PATENTS

| | | |
|---|---|---|
| 2,616,442 | Holmes | Nov. 4, 1952 |
| 2,630,129 | Holmes | Mar. 3, 1953 |

FOREIGN PATENTS

| | | |
|---|---|---|
| 419,920 | Great Britain | Nov. 21, 1934 |
| 461,203 | Italy | June 17, 1951 |